United States Patent [19]
Shimada

[11] Patent Number: 6,052,243
[45] Date of Patent: Apr. 18, 2000

[54] MAGNETIC DISK UNIT FOR DETECTING CONTACT BETWEEN A MAGNETIC HEAD SLIDER AND A MAGNETIC DISK AND METHOD THEREFOR

[75] Inventor: Minoru Shimada, Tokyo, Japan

[73] Assignee: NEC Corporation, Tokyo, Japan

[21] Appl. No.: 08/986,729

[22] Filed: Dec. 8, 1997

[30] Foreign Application Priority Data

Dec. 6, 1996 [JP] Japan ..................................... 8-342759

[51] Int. Cl.[7] ............................... G11B 5/09; G11B 5/02; G11B 21/02
[52] U.S. Cl. .................................. 360/46; 360/25; 360/75
[58] Field of Search ................... 360/25, 46, 53, 360/75

[56] References Cited

U.S. PATENT DOCUMENTS 5,822,139  10/1998  Ayabe ........................................ 360/24

FOREIGN PATENT DOCUMENTS

1-100779  4/1989  Japan .

*Primary Examiner*—W. Chris Kim
*Attorney, Agent, or Firm*—Young & Thompson

[57] ABSTRACT

A magnetic disk unit is provided with a storage device for storing a signal output value in each position on a first circumference of a magnetic disk, and a contact detector for relating a signal output value in each position on a second circumference of the magnetic head slider to each position on the first circumference. The latter signal output values are standardized by dividing by the corresponding signal output value stored in the storage device. Contact between the magnetic disk and the magnetic head slider is detected if the standardized output exceeds a preset reference value. The contact detector outputs a signal for instructing an actuator control circuit to move the magnetic head slider to a predetermined home position if contact between the magnetic disk and the magnetic head slider is detected.

9 Claims, 9 Drawing Sheets

READ SIGNAL OUTPUT IN LIFTED STATE STORED
IN MEMORY OF LATCHING CIRCUIT

FIG.7B

FULL LINE : READ SIGNAL OUTPUT IN FLYNG STATE
BROKEN LINE : INCREASED READ SIGNAL
OUTPUT IN CONTACT

FIG.7C

FIG.8 a : STANDARDIZED READ SIGNAL OUTPUT IN FLYNG STATE
b : STANDARDIZED READ SIGNAL OUTPUT IN CONTACT
 (PREDETERMINED AMPLITUDE VALUE)

A : FLYING HEIGHT OF MAGNETIC HEAD SLIDER
B : MEDIUM GLIDE HEIGHT

MAGNETIC DISK UNIT FOR DETECTING CONTACT BETWEEN A MAGNETIC HEAD SLIDER AND A MAGNETIC DISK AND METHOD THEREFOR

BACKGROUND OF THE INVENTION

1. Field of the Invention

The present invention relates to a magnetic disk unit used as an external storage for an information processor such as a computer to a method of detecting contact between a magnetic head slider and a magnetic disk, and to a device for detecting such contact.

2. Description of the Related Art

Heretofore, for a method of detecting contact between a magnetic head slider and a magnetic disk, a method of using an acoustic emission (AE) sensor is known as disclosed in Japanese published unexamined patent application No. Sho61-32278. The above patent application discloses a magnetic head provided with an AE sensor for detecting contact between a magnetic head slider and a magnetic disk surface that prevents the disk surface from being damaged by moving the magnetic head slider to a landing zone or stopping the rotation of a disk after the contact is detected.

The AE sensor described in the above patent application is mainly used for detecting contact between the slider and the disk depending upon whether magnetic powder and others exist or not. The above patent application also discloses preventing recorded information from being destroyed by operating a protection network when the AE sensor detects the contact.

A method of detecting contact using a contact sensor typified by an AE sensor is certainly an effective method in relation to verifying contact between a magnetic head slider and a magnetic disk. However, it is difficult to apply the above method of detecting contact using a contact sensor to an actual magnetic disk unit because a small-sized magnetic disk unit has (1) a problem of installed space, (2) a problem of a cost when a piezoelectric element is built in a slider to solve the above problem of space, (3) a problem of the wiring of a fine wire for a contact sensor, (4) a problem that another circuit is required for the contact sensor and others.

For a method of solving the above problems, Japanese published unexamined patent application No. H1-100779 discloses a detecting method based upon the output of a signal when a magnetic head and a magnetic disk come in contact so as to obtain a magnetic disk unit wherein recorded information can be effectively prevented from being destroyed when the magnetic head detects contact with the magnetic disk. In the above detecting method, contact between a magnetic head and a magnetic disk is detected by detecting fluctuation larger than the predetermined one of a signal output from the magnetic head. A signal output from the magnetic head greatly fluctuates when the magnetic head and the magnetic disk come in contact. That is, in the above patent application, the output voltage of a magnetic head is amplified by an amplifier, is input to a rectifying circuit via an impedance conversion circuit and rectified, is further smoothed by a time constant circuit and the collapse below a fixed level of the signal is detected by a comparison circuit.

However, in the above conventional type magnetic disk unit, though the above problem of the AE sensor can be solved based upon the output of a signal, contact cannot be judged only based upon the fluctuation of output because fluctuation due to an attachment on the surface of the magnetic head slider, the waviness of the medium and others is included in the fluctuation of output. Because the fluctuation of output due to contact between the magnetic head slider and the magnetic disk is extremely small, while the fluctuation due to an attachment on the surface of the magnetic head slider, the waviness of the medium and others is very large.

Therefore, there is a problem that contact cannot precisely be judged by contact judging means disclosed in the above Japanese published unexamined patent application No. H1-100779, compared with judgment based upon acoustic emission and abrasion caused by contact is considerably in progress when contact between the magnetic head slider and the magnetic disk is indicated.

As described above, the above related art has the following problems:

The first problem is that if contact is detected as the fluctuation exceeding predetermined fluctuation of an envelope output signal (a read output signal of a magnetic head), change exceeding the amplitude of the fluctuation of an envelope caused by an attachment on the surface of a magnetic head slider, the waviness of a magnetic disk and others is required and therefore, if change is included in the above amplitude of the fluctuation of an envelope, contact cannot be detected. Particularly, the fluctuation of output in the start of contact is extremely small, compared with the fluctuation of output due to and the waviness of a medium and an attachment on the surface of a magnetic head slider and contact cannot be judged.

Therefore, the realization of a method of solving these problems and detecting contact at great sensitivity is desired.

The second problem is that in conventional type measuring technique by a contact sensor typified by an AE sensor, an AE sensor is required to be fixed, a method of wiring an output line is complicated in addition to the increase of mobile weight, further, an amplifier for a contact sensor is required to be installed and an apparatus is complicated and high-priced to compact the above devices.

For the reason, it can be given that the output of an AE sensor is very small, it is very difficult to detect the change of a signal without an amplifier and the increase of mobile weight requires the change of design because of the miniaturization and the reduction in weight of a magnetic head slider.

An AE sensor can detect contact between a magnetic head and a magnetic disk at great sensitivity, however, it has the problems shown in the above items (1) to (4) and others.

Therefore, the establishment of a contact detecting method provided with sensitivity equal to the sensitivity of an AE sensor is desired.

As described above, for a method of detecting contact between a magnetic disk and a magnetic head slider, a detecting method using a contact sensor typified by an AE sensor is typical and contact can be certainly detected at great sensitivity according to the above contact detecting method by a contact sensor, however, from the viewpoint of a magnetic disk unit as described above, the above contact detecting method has a problem that the method is not realistic. Therefore, the establishment of a contact detecting method from the viewpoint of a magnetic disk unit is desired.

SUMMARY OF THE INVENTION

The present invention is made to solve the above problems and the object is to provide a magnetic disk unit provided with a contact detecting method for evaluating the reliability of the magnetic disk unit and a protective function utilizing the method the reliability of which is enhanced.

A magnetic disk unit according to the present invention is provided with a rotated magnetic disk and a magnetic head slider slightly flying over the above magnetic disk and provided with storage means for storing a signal output value in each position on a first circumference of the above magnetic disk obtained with the magnetic head slider flying beforehand and contact detecting means for standardizing by relating a signal output value in each position on a second circumference of the above magnetic head slider with each position on the above first circumference and dividing the above signal output value in each position on the second circumference by the above signal output value stored in the above storage means every position and for detecting contact between the magnetic disk and the magnetic head slider based upon the change of the standardized output of a read signal.

The above contact detecting means detects contact between the above magnetic disk and the above magnetic head slider if the standardized output of a read signal exceeds a predetermined reference value.

The magnetic disk unit according to the present invention is further provided with actuator control means for controlling the position of the above magnetic head slider and the actuator control means outputs a signal for moving the magnetic head slider to a predetermined home position if the above contact detecting means judges the magnetic disk and the magnetic head slider are in contact.

BRIEF DESCRIPTION OF THE DRAWINGS

The novel features believed the characteristic of the invention are set forth in the appended claims. The invention itself, however, as well as other features and advantages thereof, will be best understood by reference to the detailed description which follows, read in conjunction with the accompanying drawings, wherein:

DESCRIPTION OF THE PREFERRED EMBODIMENTS

Preferred embodiments of the invention will be described below. In the preferred embodiments of the present invention, a signal output from a magnetic head slider is standardized based upon the output of a signal acquired when the magnetic head slider is flying by a standardizing circuit 11 shown in FIG. 1 and contact between a magnetic disk and the magnetic head slider is detected based upon the change of a standardized read signal output amplitude value shown in FIG. 5.

Figure 7A:
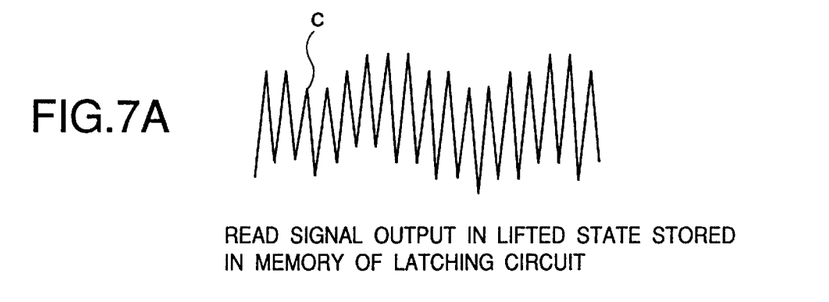
FIG. 7A is a waveform chart showing the output of a read signal when the magnetic head slider is flying which is stored in the memory of a latching circuit.
Figure 7B:
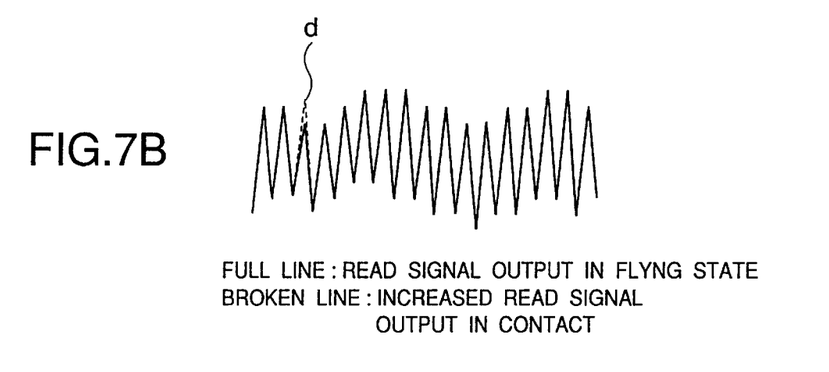
FIG. 7B is a waveform chart showing the output of a read signal when the magnetic head slider is flying and the output of a read signal the amplitude of which is amplified when the magnetic head slider and the magnetic disk come in contact and FIG. 7C is a waveform chart showing the output of a standardizing circuit.
Figure 7C:
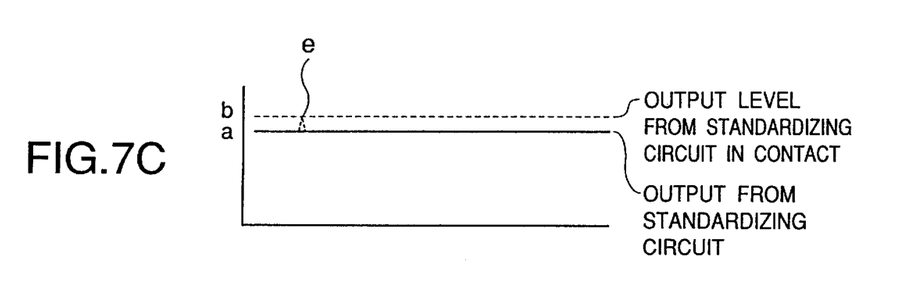

The above standardization of a signal waveform includes dividing a read signal output value in each position by an output value of a signal acquired when the head is flying (hereinafter called in a flying state). Hereby, as a waveform in the following part is converted to a waveform shown by 'e' in FIG. 7C even if contact occurs in a part shown by 'c' in FIG. 7A in which output is low and the change of output shown by a dotted line 'd' in FIG. 7B occurs, contact can be detected at high sensitivity as the change of an amplitude value. FIG. 7A shows a signal in a flying state, FIGS. 7B and 7C respectively show the waveform of a read signal and a standardized signal before and after standardization. A full line shown in FIGS. 7A to 7C shows a waveform in a flying state and a broken line shows a waveform when the magnetic head slider and a magnetic disk come in contact.

That is, a standardized signal m is a signal provided with a waveform shown in FIG. 7A when the magnetic head slider 1 is flying from the surface of a magnetic disk 2, however, as the above waveform is disordered if the magnetic head slider 1 and the magnetic disk 2 come in contact, contact between the magnetic head slider 1 and the magnetic disk 2 is detected by detecting the above fluctuation.

Sensitivity equal to or exceeding sensitivity in a contact detecting method by an AE sensor can be obtained by using an output signal g amplified by an information regeneration mechanism of a magnetic head 16 and standardized by the output of a signal k acquired when the magnetic head slider 1 is flying.

As described above, in this embodiment of the present invention, as detection is based upon the amplitude value of a read/written signal when the magnetic head slider and a magnetic disk come in contact, new facilities for evaluation are not required to be provided and contact detection evaluation can be readily executed in an actual magnetic disk unit.

In this embodiment of the present invention, as contact is detected at high sensitivity, sensitivity equal to that in a contact detecting method by an AE sensor is obtained by standardizing a read signal by an output signal in a flying state and detecting the fluctuation of the output value.

Referring to the drawings, embodiments of the present invention will be described further in detail below.

Figure 1:
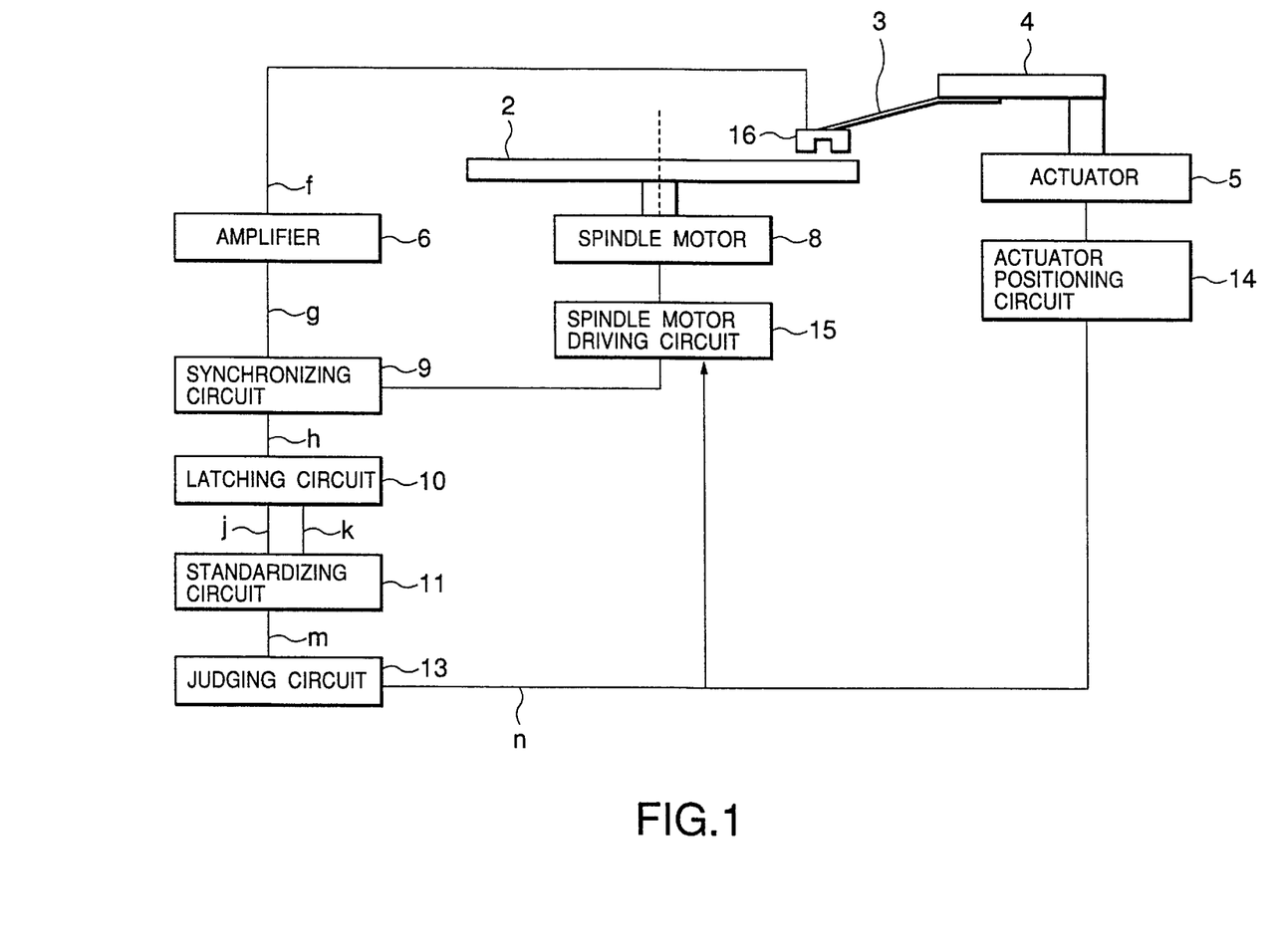
FIG. 1 is a block diagram showing the constitution of an embodiment of the present invention.

FIG. 1 shows the constitution of an embodiment of the present invention. A magnetic disk unit according to the present invention is provided with a magnetic head 16 including a magnetic head slider 1, a magnetic disk 2, a suspension 3 for pressing and supporting the magnetic head slider 1, an arm 4 for fixing the suspension 3 and a mechanism 14 for driving and positioning an actuator 5. The magnetic head slider 1 can be positioned on an arbitrary information track which is a destination by moving the magnetic head slider 1 in the radial direction of the magnetic disk 2 freely.

In addition, the above magnetic disk unit is provided with an amplifier 6 for amplifying an output signal f from the magnetic head 16, a spindle motor 8 for rotating the magnetic disk 2 and a spindle motor driving circuit 15 for driving the spindle motor. In the present invention, as a read signal acquired in a flying state and the output of a read signal acquired every fixed time are compared in the corresponding positions on different circumferences generally, synchronization is required. A reference number 9 denotes a circuit for synchronizing a read signal based upon an index signal p shown in FIG. 6 from the spindle motor driving circuit 15 and the operation of output in each position is enabled by synchronization. If an index signal p is written on the magnetic disk 2, it can be also used in place of an index signal p of the spindle motor 8.

A read signal shown in FIG. 7A acquired in a flying state is stored in memory 20 in a latching circuit 10 when a magnetic disk unit is manufactured. A read signal shown in FIG. 7B acquired every fixed time in a standardizing circuit 11 is standardized by a read signal h in a flying state stored in the memory. The above standardization of a signal waveform includes dividing the output q of a read signal in the corresponding positions on different circumferences by the output r of a read signal acquired in a flying state. In other words, the output of a read signal in each position on a specific track is stored in the memory 20, a signal output value in each position on another track to be read is related to each position on the specific circumference and the output of a read signal acquired in a flying state is divided by the output of a read signal stored in the memory 20 for every position. At this time, a position on a different track on a line which passes the center of the disk for example is related. Hereby, as an original waveform is converted to a waveform shown in FIG. 7C even if contact occurs in a part shown by 'c' in FIG. 7A in which output is low and the change of output shown by a broken line d in FIG. 7B occurs, contact can be detected at high sensitivity as the change of an amplitude value shown by 'e' in FIG. 7C. If a waveform is not converted and kept a waveform shown in FIG. 7B, an output value d is not detected because the output value d is smaller than other larger output values though contact occurs and contact cannot be judged.

Figure 8:
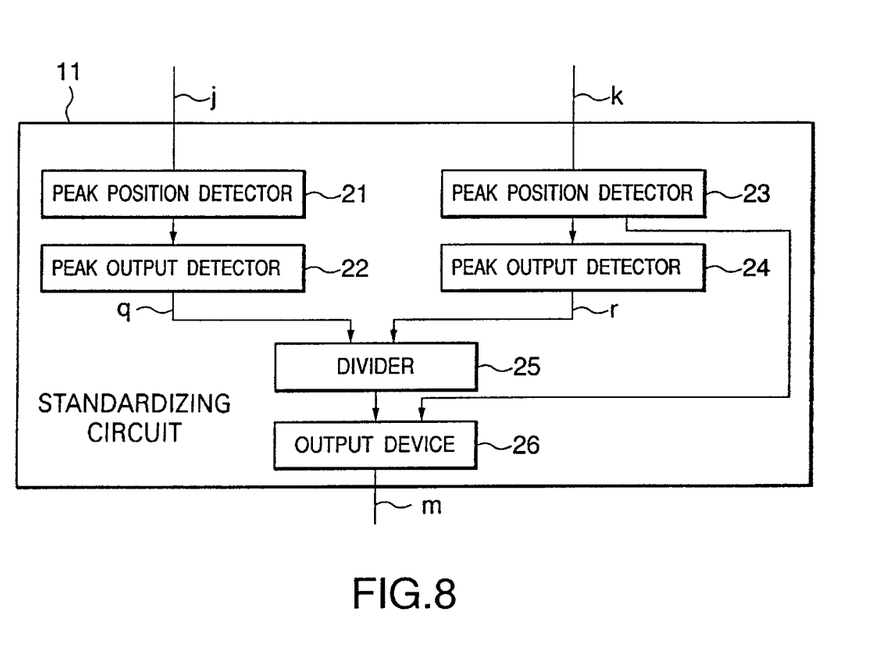
FIG. 8 is a block diagram showing the constitution of the standardizing circuit 11.

FIG. 8 is a block diagram showing a standardizing circuit. A read signal k acquired in a flying state which is stored in the memory 20 of the latching circuit 10 and a read signal j acquired every fixed time are input to the standardizing circuit 11. In the standardizing circuit 11, the positions of peaks of each input waveform are detected by peak position detectors 21 and 23, output at the peak is detected by peak output detectors 22 and 24, the output in the corresponding positions is input to a divider, an operation is executed and the result of division in each position is output as a standardized read signal m.

A waveform processed by the standardizing circuit 11 is a flat waveform without a waviness in a flying state as shown by a full line in FIG. 7C and if the magnetic head slider and a magnetic disk come in contact, output in the contact position e is increased as shown by a broken line in FIG. 7C.

That is, if the magnetic head slider and a magnetic disk are not in contact, a fixed value a is obtained and if the magnetic disk and the magnetic head slider come in contact, a high output value b is obtained in the contact position. The above high output value b will be described later.

Figure 10:
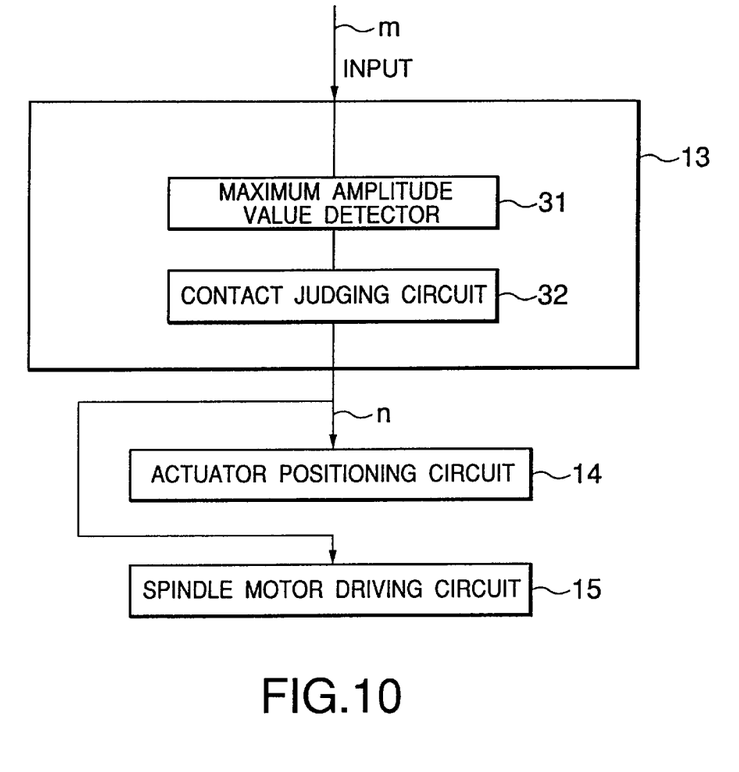
FIG. 10 shows the constitution of a judging circuit 13 and its connection to an actuator positioning circuit 14 and a spindle motor driving circuit 15.
Figure 11:
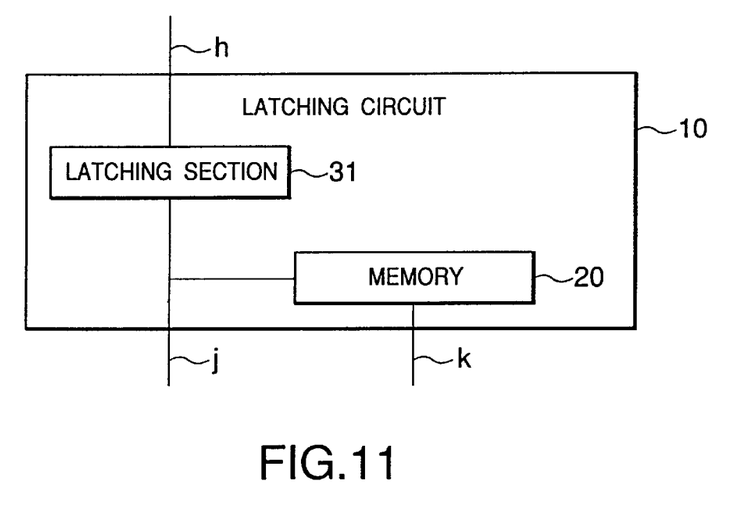
FIG. 11 is a block diagram showing the constitution of the latching circuit 10.

FIG. 10 is a block diagram showing a judging circuit 13. Output m from the standardizing circuit 11 is input to the judging circuit 13. First, the maximum amplitude value (Vmax) of the output at a peak is detected by a maximum amplitude detector 31. Next, Vmax is input to a contact judging circuit 32 and it is judged whether the magnetic head slider and a magnetic disk is in contact or the magnetic head slider disk is flying. A peak output maximum amplitude value b acquired in contact is required to be set in the judging circuit 13 beforehand. Vmax and b are compared, if Vmax<b, a magnetic head slider is judged flying and if Vmax≧b, the magnetic head slider and the magnetic disk are judged in contact. If the magnetic head slider and a magnetic disk are judged in contact, the judging circuit 13 controls an actuator positioning circuit 14, instructs the magnetic head slider 1 to move to a landing zone and then, stops the spindle motor 8 for rotating the magnetic disk 2 by controlling the spindle motor driving circuit 15.

The value b is required to be set to a little lower value because output m from the standardizing circuit 11 varies a little due to noise and others.

Figure 9:
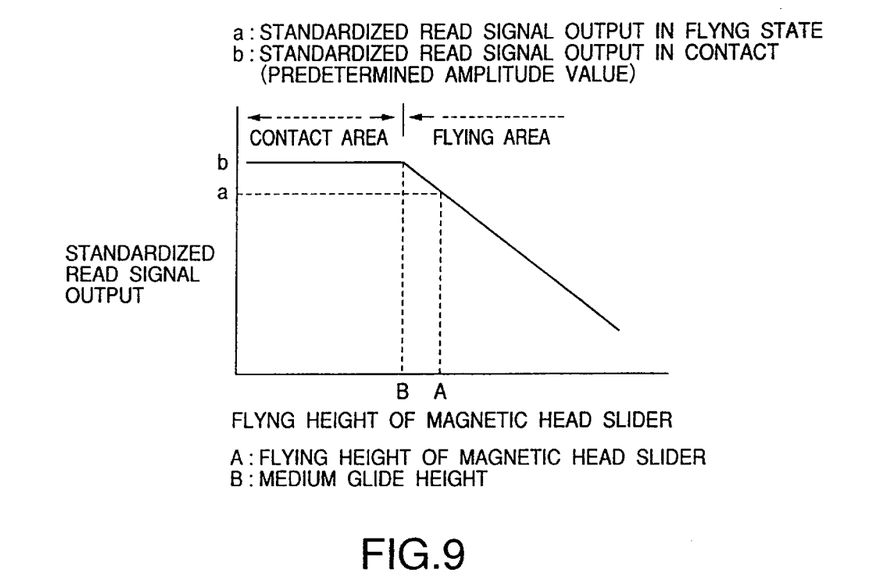
FIG. 9 shows relationship between quantity in which the magnetic head slider 1 is flying and the standardized output of a read signal.

The high output value b means the standardized output b of a read signal shown in FIG. 9. The value b is required to be calculated beforehand. A method of calculating the value b, referring to FIG. 9 is as follows: The relationship between the flying height of the magnetic head slider 1 and the standardized output of a read signal is shown in FIG. 9. As the flying height of the magnetic head slider 1 is decreased, the standardized output of a read signal is increased and when the flying height is equal to the glide height of a magnetic disk (A=B), the output of a read signal is saturated. The reason is that the magnetic head slider comes in contact with a magnetic disk. Therefore, when the standardized output of a read signal is equivalent to the value b, it can be judged that the magnetic head slider and a magnetic disk are in contact.

As the driving of the magnetic disk unit is stopped when contact occurs by the above series of operation in this embodiment of the present invention, recorded data can be prevented from being destroyed. As it does not occur normally that abrasion immediately progresses even if contact occurs and the magnetic head collides with a magnetic disk, measures such as backup can be taken as it is.

Next, the operation of this embodiment of the present invention will be described. The magnetic disk 2 attached to the rotation shaft of the spindle motor 8 as shown in FIG. 1 is driven by the spindle motor driving circuit 15 and rotated at fixed rotating speed.

The magnetic head slider 1 is flying with clearance determined by the peripheral speed of the rotated magnetic disk 2, the air bearing surface design of the magnetic head slider 1 and the load force of the suspension 3. As the magnetic head slider 1 is normally flying over a data area on the magnetic disk 2 with the determined clearance, the magnetic disk 2 and the magnetic head slider 1 never come in contact.

Figure 6:
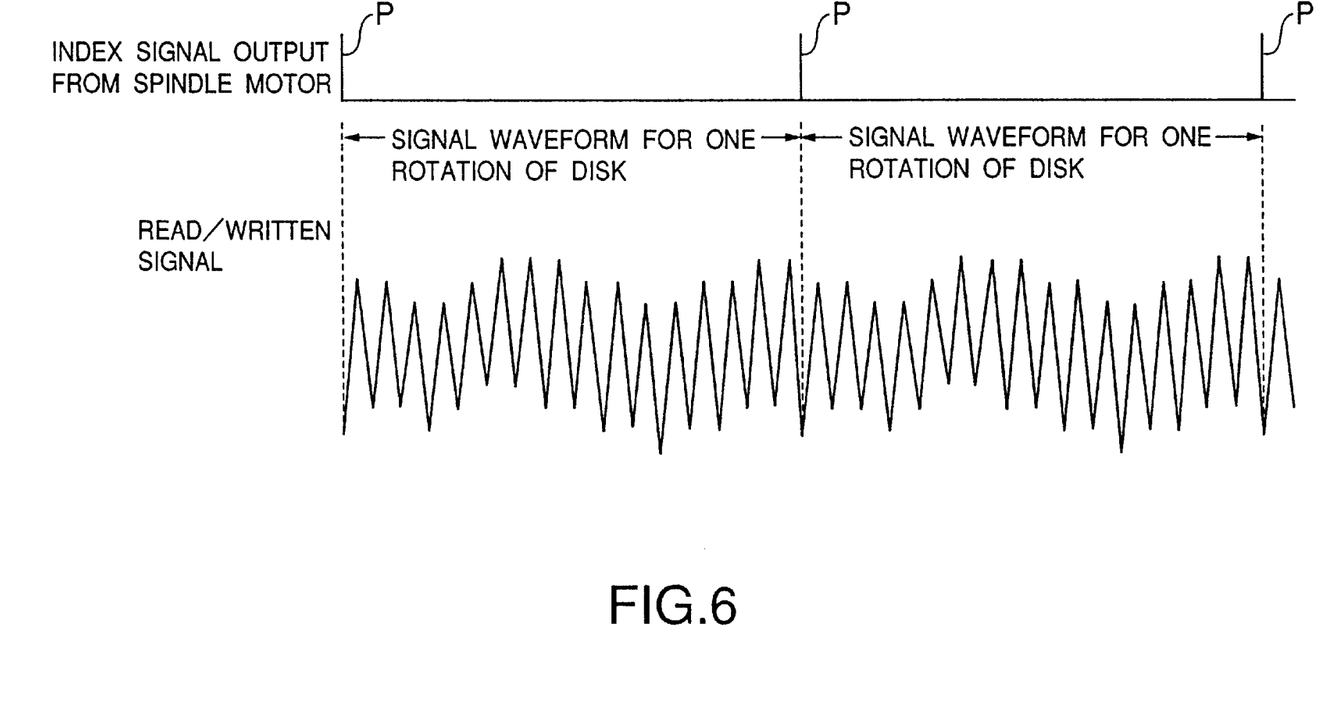
FIG. 6 is a waveform chart showing relationship between an index signal from a spindle motor and a read/written signal.

The read output of the magnetic head slider 1 at this time, that is, the output of a read signal has a waveform shown in FIG. 6.

Figure 2:
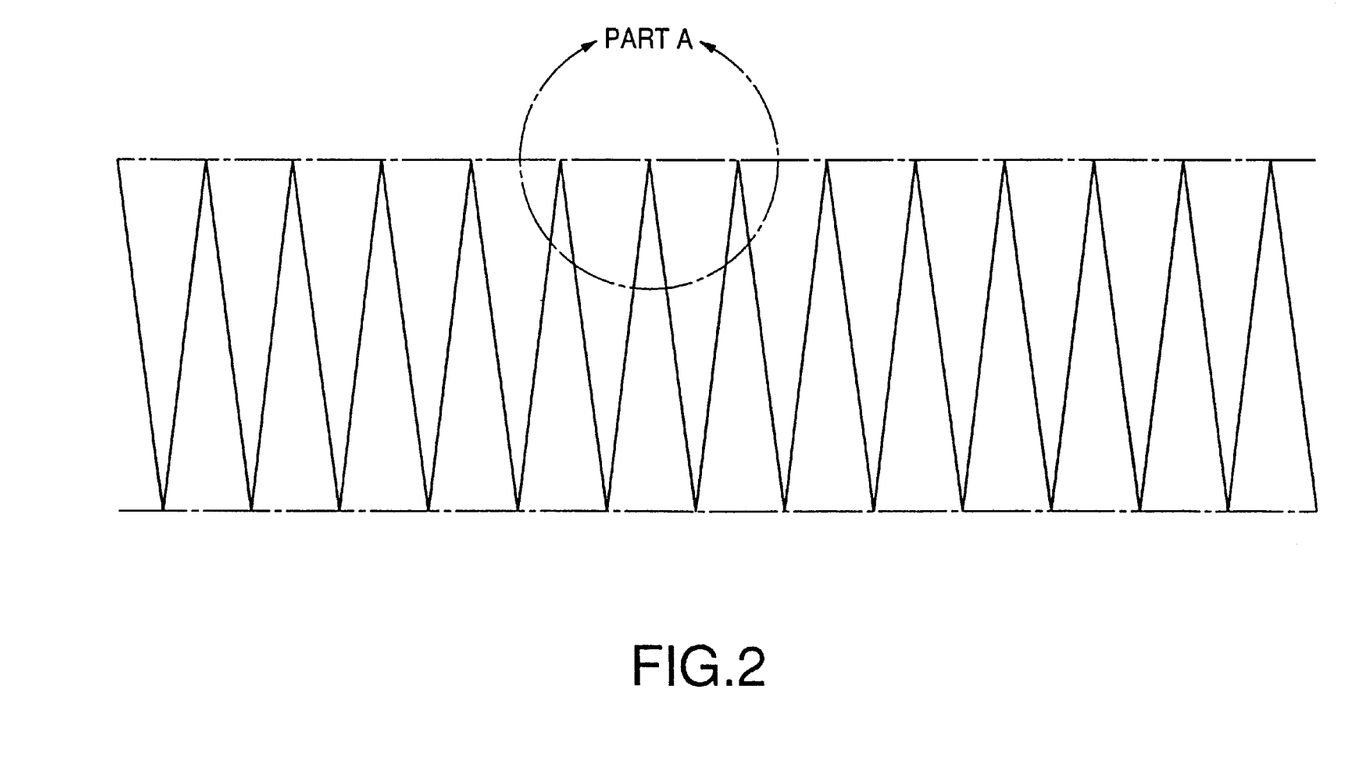
FIG. 2 is a signal waveform chart showing a normal read/written signal acquired when a magnetic head slider is flying over a magnetic disk in the above embodiment of the present invention.
Figure 3:
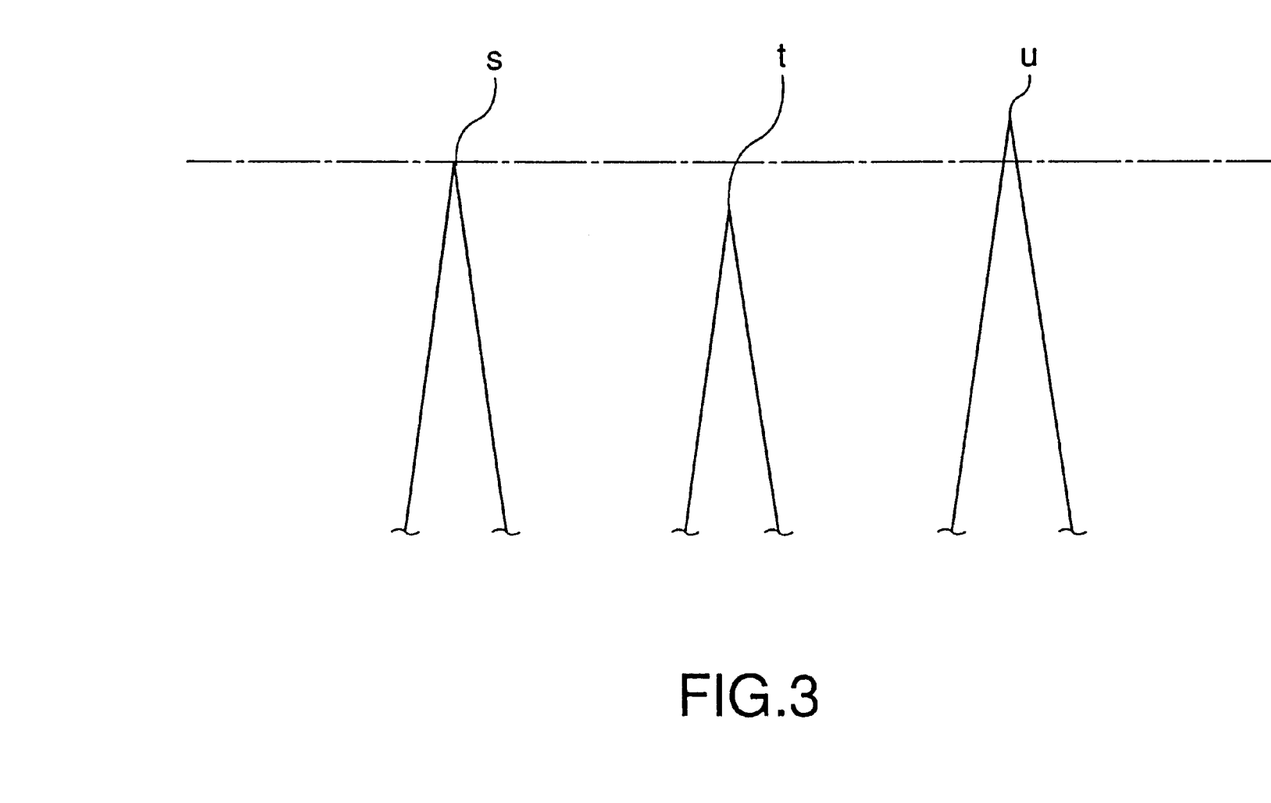
FIG. 3 is a signal waveform chart for explaining the embodiment of the present invention and magnifies a part A in FIG. 2.
Figure 4A:
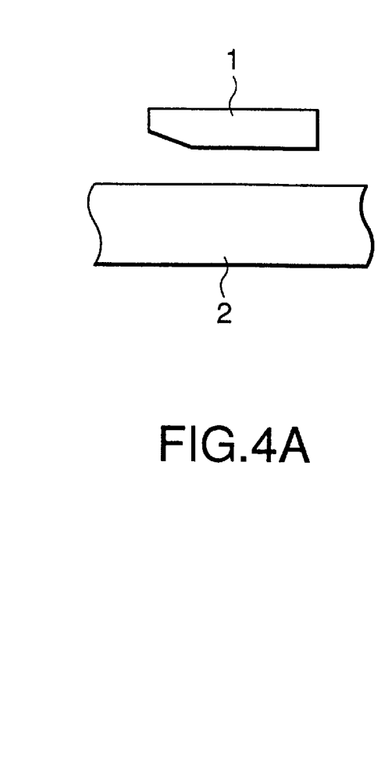
FIGS. 4A, 4B, 4C and 4D schematically show the behavior of the magnetic head slider against a asperity on the magnetic disk in the embodiment of the present invention.
Figure 4B:
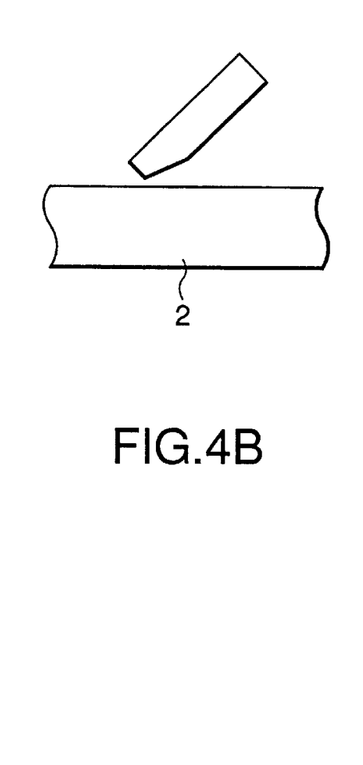
Figure 4C:
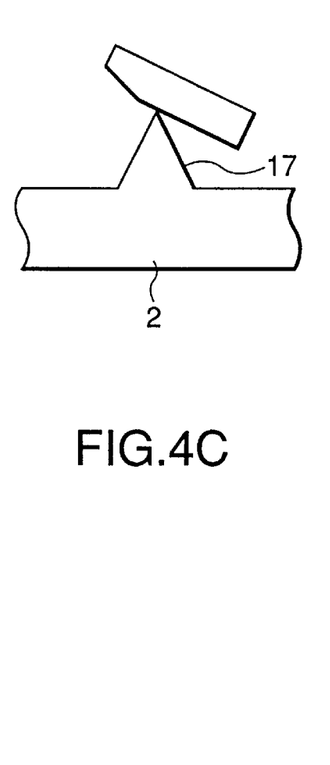
Figure 4D:
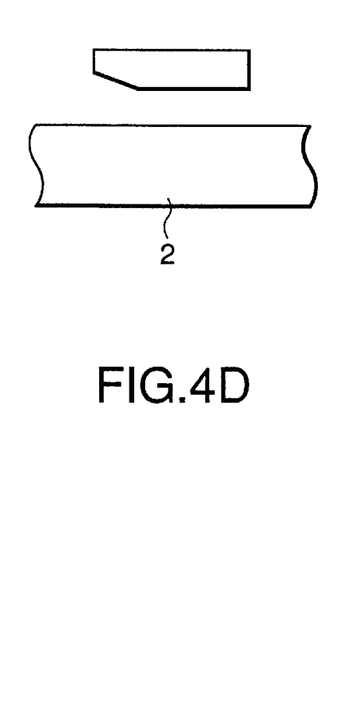

The output of a read signal in a flying state is not fixed and includes fluctuation shown in FIG. 6 and caused by the waviness of a medium, an attachment on the surface of the slider and others. Even if the waviness of a medium is very small as shown in FIG. 2, output at a peak is not fixed as shown in FIG. 3 which is a signal waveform chart shown by magnifying a part A in FIG. 2 when FIG. 2 is viewed with it magnified and there is the difference in output caused by an attachment on the surface of the magnetic head slider 1, the roughness of the surface of a magnetic disk and others.

If the magnetic head slider 1 and the magnetic disk 2 come in contact in a part (for example, 'u' in FIG. 3) in which the output of a read signal is the highest, contact can be judged based upon the increase of an envelope amplitude value. However, as the change of output by contact is not reflected upon the envelope amplitude value if not (for example, contact occurs in 't' in FIG. 3), contact cannot be judged in case output does not exceed an alternate long and short dash line.

When the magnetic head slider 1 comes in contact with an asperity 17 made by dust and others attached to the magnetic disk 2 as shown in FIGS. 4, the flying height of the magnetic head slider 1 varies in order shown in FIG. 4D, FIG. 4C, FIG. 4B and FIG. 4A and as a result, fluctuation occurs in read signal output voltage.

The fluctuation of output voltage when the magnetic head slider 1 and the magnetic disk 2 are in contact is normally a few mV or less and very small.

Therefore, if contact occurs in a position t shown in FIG. 3 in which output is low, it is hidden in the fluctuation amplitude of an envelope of the output of a read signal and contact cannot be detected at high sensitivity. Therefore, to detect contact based upon the output of a read signal, sensitivity is required to be enhanced.

In an embodiment of the present invention, the output of a read signal in a flying state is amplified by an amplifier 6 so that the voltage of the signal is a few volts when a magnetic disk unit is manufactured and the amplified signal is synchronized with an index signal p from the spindle motor 8 by a synchronizing circuit 9 as shown in FIG. 6. The synchronized signal is stored in the latching circuit 10.

After the operation of the magnetic disk unit is started, the following contact detecting operation is executed periodically: The similar processing for a read signal until the synchronizing circuit 9 is executed together with the above operation and a signal in a flying state is standardized by the standardizing circuit 11.

FIG. 7C shows an example of the standardized signal. If the magnetic head slider is not in contact with a magnetic disk, the fluctuation of amplitude caused by an attachment on the surface of the magnetic head slider, the waviness of the magnetic disk, the roughness of the surface and others is smoothed and a standardized value is fixed as shown by the full line in FIG. 7C. However, as contact occurs in the position e, the standardized value reaches the value b shown by a broken line in FIG. 7C in a contact position and the change of output, that is, the increase of output occurs.

Figure 5:
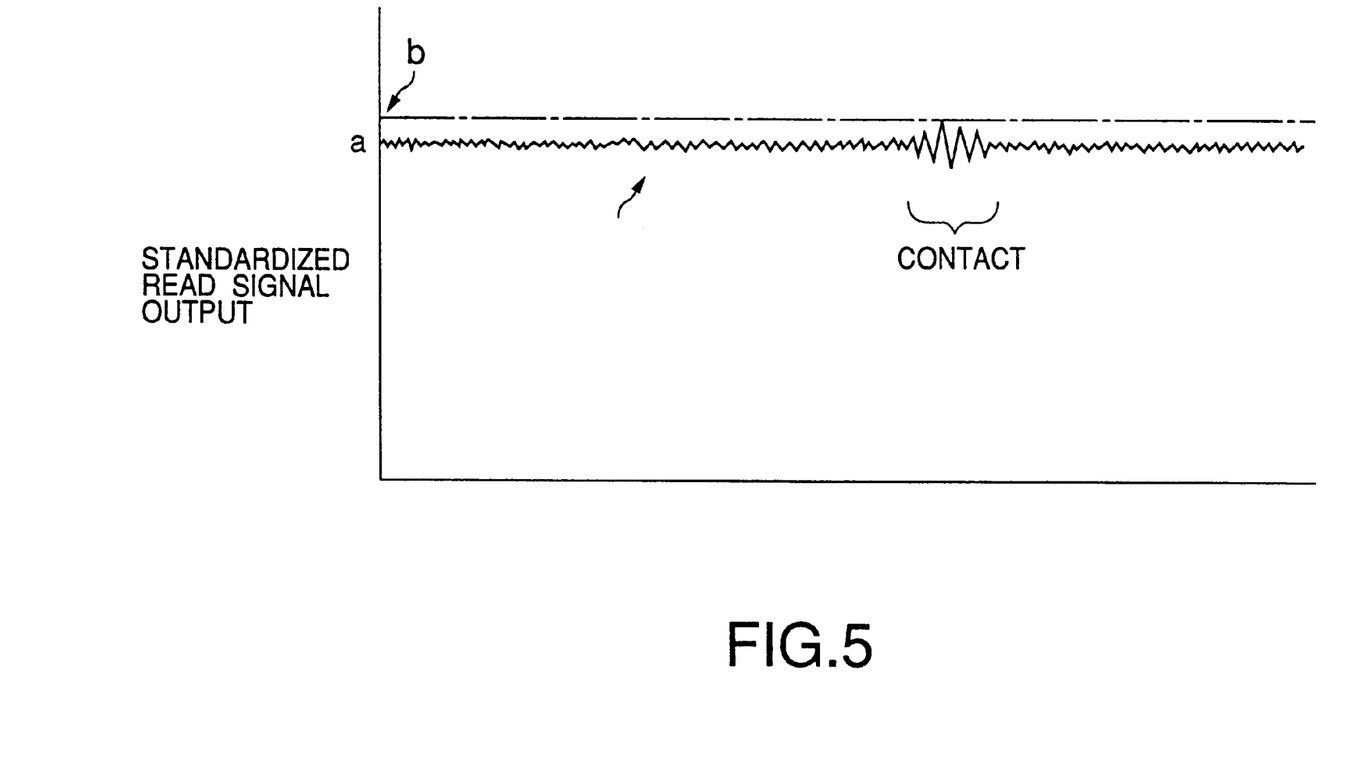
FIG. 5 shows the output of a read/written signal when the magnetic head slider and the magnetic disk come in contact standardized by the output of a read/written signal when the magnetic head slider is flying.

To detect the above change of output, a standardized signal m is input to the judging circuit 13, the judging circuit 13 judges failure if the output value b shown in FIG. 5 acquired in contact is input and outputs an output signal n for showing failure.

If the output value b shown in FIG. 5 acquired when the magnetic head slider 1 and the magnetic disk 2 come in contact is input to the judging circuit 13, the magnetic head slider 1 is moved to a contact start/stop (CSS) zone under the control of the actuator positioning circuit 14 and a motor rotating the magnetic disk is stopped by the control of the spindle motor driving circuit 15.

Contact between the magnetic head slider 1 and the magnetic disk 2 can be judged at high sensitivity based upon a read signal by the above series of operation and the driving of the magnetic disk unit can be stopped at that time.

As read/write is still sufficiently enabled when the above contact is verified, measures such as backup can be taken and data is prevented from being destroyed.

As described above, the present invention has the following effect:

First effect of the present invention is that a contact sensor typified by an AE sensor which has been used is not required because the output of a read signal is used for detecting contact. Also, as according to the present invention, contact can be readily detected in an actual magnetic disk unit, any problem of space, the cost, the installation of a circuit for a sensor and others which have been problems if the contact sensor is used is solved.

Second effect of the present invention is that contact can be detected at very high sensitivity because the output of a read signal in contact is standardized by the preset output of a read signal in a flying state. Hereby, a problem in a conventional type evaluation method of judging contact based upon the change of the output of a read signal (that is, a problem that if contact occurs in a part in which the output of a read signal is small, the above contact is hidden in the fluctuation of output caused by an attachment on the surface of the magnetic head slider, the waviness of a magnetic disk and others and contact cannot be detected) is solved and contact can be detected at sensitivity equal to that of an AE sensor.

Third effect of the present invention is that as an actuator moves the magnetic head slider to a predetermined home position when contact occurs if a protective function utilizing contact detecting means according to the present invention is added, the destruction of data due to the damage of a magnetic disk and others is never caused.

As clarified by the above effect, in the magnetic disk unit according to the present invention, as contact between the magnetic head slider and the surface of a magnetic disk is detected based upon the change of the standardized output of a read signal, the detection of contact which is excellent in repeatability and sensitivity can be executed. Also, as the magnetic head slider is not slid for a long time at high speed on a magnetic disk because the detection of contact at this time is judged when contact begins, no destruction of data due to the damage of the disk and others occurs. As a magnetic disk is hardly damaged, data can be backed up and the magnetic disk unit can be used without anxiety. That is, effect that the magnetic disk unit the reliability of which is especially enhanced is provided is produced.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A magnetic disk unit provided with a rotated magnetic disk and a magnetic head slider slightly flying over said magnetic disk, comprising:

storage means for storing a signal output value in each position on a first circumference of said magnetic disk; and contact detecting means for relating a signal output value in each position on a second circumference of said magnetic head slider to each corresponding position on said first circumference, for standardizing the signal output value at each position on the second circumference by dividing by the corresponding said signal output value stored in said storage means, and for detecting contact between said magnetic disk and said magnetic head slider based upon a change of the standardized signal output value.

2. A magnetic disk unit provided with a rotated magnetic disk and a magnetic head slider slightly flying over said magnetic disk, comprising:

memory for storing a signal output value in each position on a first circumference of said magnetic disk; and a contact detector for relating a signal output value in each position on a second circumference of said magnetic head slider to each corresponding position on said first circumference, for standardizing the signal output value at each position on the second circumference by dividing by the corresponding said signal output value stored in said memory, and for detecting contact between said magnetic disk and said magnetic head slider based upon a change of the standardized signal output value.

3. A magnetic disk unit according to claim 1, wherein:

said contact detecting means detects contact between said magnetic disk and said magnetic head slider if the standardized signal output value exceeds a preset reference value.

4. A magnetic disk unit according to claim 2, wherein:

said contact detector detects contact between said magnetic disk and said magnetic head slider if the standardized signal output value exceeds a preset reference value.

5. A magnetic disk unit according to claim 1, further comprising, actuator control means for controlling the position of said magnetic head slider, and wherein said contact detecting means outputs a signal for instructing said actuator control means to move said magnetic head slider to a predetermined home position if contact between said magnetic disk and said magnetic head slider is detected.

6. A magnetic disk unit according to claim 2, further comprising, an actuator control circuit for controlling the position of said magnetic head slider, and wherein said contact detector outputs a signal for instructing said actuator control circuit to move said magnetic head slider to a predetermined home position if contact between said magnetic disk and said magnetic head slider is detected.

7. A magnetic disk unit provided with a rotated magnetic disk and a magnetic head slider slightly flying over said magnetic disk, comprising:

storage means for storing a signal output value in each position on a first circumference of said magnetic disk;

first peak position detecting means for detecting the position of the peak of a signal value output from said magnetic head slider;

first peak output detecting means for holding the output of a signal in the position of the peak detected by said first peak position detecting means;

second peak position detecting means for detecting the position of the peak of said signal output value stored in said storage means;

second peak output detecting means for holding the output of a signal in the position of the peak detected by said second peak position detecting means;

dividing means for relating a signal output value in each position on a second circumference output from said first peak output detecting means to each position on said first circumference and for standardizing the signal output value at each position on the second circumference by dividing by a corresponding signal output value output from said second peak output detecting means;

maximum amplitude detecting means for detecting the maximum amplitude value of the standardized signal output value; and contact judging means for judging that said magnetic disk and said magnetic head slider are in contact if the maximum amplitude value detected by said maximum amplitude detecting means exceeds a preset reference value.

8. A magnetic disk unit provided with a rotated magnetic disk and a magnetic head slider slightly flying over said magnetic disk, comprising:

memory for storing a signal output value in each position on a first circumference of said magnetic disk;

a first peak position detector for detecting the position of the peak of a signal value output from said magnetic head slider;

a first peak output detector for holding the output of a signal in the position of the peak detected by said first peak position detector;

a second peak position detector for detecting the position of the peak of said signal output value stored in said memory;

a second peak output detector for holding the output of a signal in the position of the peak detected by said second peak position detector;

a divider for relating a signal output value in each position on a second circumference output from said first peak output detector to each position on said first circumference and for standardizing the signal output value at each position on the second circumference by dividing by a corresponding signal output value output from said second peak output detector;

a maximum amplitude detector for detecting the maximum amplitude value of the standardized signal output value; and a contact judging circuit for judging that said magnetic disk and said magnetic head slider are in contact if the maximum amplitude value detected by said maximum amplitude detector exceeds a preset reference value.

9. A method of detecting contact between a magnetic head slider and a magnetic disk in a magnetic disk unit, comprising the steps of:

storing a signal output value for each position on a first circumference of said magnetic disk;

relating a signal output value in each position on a second circumference of said magnetic head slider to each position on said first circumference and standardizing the signal output value at each position on the second circumference by dividing by the corresponding said signal output value stored in said storing step; and judging that said magnetic disk and said magnetic head slider are in contact if a signal output value standardized in the previous step exceeds a preset reference value.

* * * * *